US008311539B2

(12) United States Patent
Luo et al.

(10) Patent No.: US 8,311,539 B2
(45) Date of Patent: Nov. 13, 2012

(54) ESTABLISHMENT OF A CONNECTION IN RADIO COMMUNICATION SYSTEMS

(75) Inventors: Jijun Luo, München (DE); Eiman Bushra Mohyeldin, München (DE); Jianming Pan, Vienna (AT); Peter Slanina, Judenau (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1045 days.

(21) Appl. No.: 12/086,889

(22) PCT Filed: Dec. 13, 2006

(86) PCT No.: PCT/EP2006/069641

§ 371 (c)(1),
(2), (4) Date: Nov. 3, 2008

(87) PCT Pub. No.: WO2007/071600

PCT Pub. Date: Jun. 28, 2007

(65) Prior Publication Data

US 2009/0239530 A1    Sep. 24, 2009

(30) Foreign Application Priority Data

Dec. 20, 2005 (EP) .................................... 05027892

(51) Int. Cl.
*H04W 4/00* (2009.01)

(52) U.S. Cl. .................. 455/434; 455/432.1; 455/435.2; 455/552.1; 370/328; 370/338

(58) Field of Classification Search .... 455/432.1–435.3, 455/552.1, 515, 517, 422.1; 370/328, 338

See application file for complete search history.

(56) References Cited

U.S. PATENT DOCUMENTS

| 6,904,282 | B2 * | 6/2005 | Cooper | 455/434 |
|---|---|---|---|---|
| 8,019,341 | B2 * | 9/2011 | Falk et al. | 455/434 |
| 8,184,596 | B2 * | 5/2012 | Karlsson et al. | 370/335 |
| 2006/0234702 | A1 * | 10/2006 | Wiberg et al. | 455/432.3 |
| 2008/0043679 | A1 * | 2/2008 | Karlsson et al. | 370/335 |
| 2010/0048217 | A1 * | 2/2010 | Deshpande et al. | 455/446 |
| 2010/0113083 | A1 * | 5/2010 | Luo et al. | 455/515 |

FOREIGN PATENT DOCUMENTS

| DE | 197 34 933 | 2/1999 |
|---|---|---|
| WO | 90/13211 | 11/1990 |

OTHER PUBLICATIONS

"Global Pilot Mechanism" ETSI STC SMG2 adhoc, Apr. 8-10, 1997.
"UMTS Baseline document; Positions on UMTS agreed by SMG including SMG#27 (UMTS 30.01 version 3.5.1—Approved by E-mail after SMG#27)" European Telecommunication Standards Institute, V3.5.1, Jan. 1999.
T. H. Le et al., "Performance of an Accessing and Allocation Scheme for the Download Channel in Software Radio" Wireless Communication and Network Conference, 2000, IEEE, Sep. 23, 2000; p. 517-521.

* cited by examiner

*Primary Examiner* — Sharad Rampuria
(74) *Attorney, Agent, or Firm* — Staas & Halsey LLP (57) ABSTRACT

In a method for establishment of a connection in a radio communication system, a user terminal selects an operator, based on information on at least one operator of a radio communication system in a country-specific pilot channel, selects a radio communication system based on information on at least one radio communication system in an operator-specific pilot channel for the selected operator and carries out an access to the selected radio communication system for establishment of a connection.

18 Claims, 5 Drawing Sheets

ESTABLISHMENT OF A CONNECTION IN RADIO COMMUNICATION SYSTEMS

CROSS REFERENCE TO RELATED APPLICATIONS

This application is based on and hereby claims priority to European Application No. EP05027892 filed on Dec. 20, 2005 and PCT Application No. PCT/EP2006/069641 filed on Dec. 13, 2006, the contents of which are hereby incorporated by reference.

BACKGROUND OF THE INVENTION

The invention relates to a method for the establishment of a connection in radio communication systems.

A continuously rising number of different radio communication systems, to mention only the systems according to the familiar GSM, IS-95, UMTS, CDMA2000, WLAN, WiMAX, etc. standards, for example, leads to user terminals also supporting an ever increasing number of these systems or standards and, as a result, providing the user with access to communication networks in the most varied manner. In addition, operators of radio communication systems are increasingly providing their customers with systems of different standards, with the possibility of roaming between these systems.

However, all this can disadvantageously lead to the period for establishing a connection by a user terminal being extended due to the large selection of available systems which, in addition, operate in different system-specific frequency bands, as a rule. If, for example, the user wishes to use a high-data-rate service, to mention video streaming as an example, such a service can be potentially provided by different systems. If no specific system has been preselected by the user, the user terminal, during the establishment of the connection, establishes contact to various systems or, respectively, the user terminal first attempts to receive signals from different systems—for example of the same operator—and then to select a system suitable for the selected service.

Especially when the user terminal is taken into operation at a location which it has previously not maintained a connection to a system and can thus not make use of empirical values, for example if the user is located in a foreign country after a flight, an additional aggravating factor which may extend the access time is that the local operator is not known, with whom the home operator has concluded a so-called roaming agreement in order to provide lowered connection charges to the customer. In this case, a local system or operator may be proposed to the user a number of times, with which the user must then decide whether a connection establishment is to take place or not.

From DE 197 34 933 C1, a method is known in which a mobile station located in a radio coverage area of a mobile radio network generates an adaptation to an air interface access method of the mobile radio network by signaling information transmitted on a pilot channel. In this context, the pilot channel is transmitted by at least one broadcast transmitting station of a public broadcasting system in the radio coverage area of the mobile radio network and received and evaluated by the mobile station.

To provide an overview of the increasing number of systems for users or user terminals, it has already been proposed, inter alia in the document "Global Pilot Mechanism" Tdoc SMG2 UMTS 52/97, ETSI STC SMG2 UMTS adhoc, Apr. 8-10, 1997, Lulea, Sweden, pages 1 and 2, to introduce a globally uniform pilot channel (Global Pilot Channel) on a uniform frequency channel or in a uniform frequency spectrum. On such a global pilot channel, information about the respective locally available radio access technologies (Radio Access Technology Indicator) and references (Spectral Pointers) to their spectral position should be transmitted so that a user terminal can select and access a suitable or supported radio access technology.

Radio access technologies are understood to be systems of different standards, for example GSM and UMTS which operate in different frequency bands. According to the above document, the pilot channel should be sent out either by the operators themselves which would correspondingly also have to send out information by competing operators, or by a national entity not specified in greater detail, for example the regulating authority.

However, such a uniform pilot channel has the disadvantage that with the rising number of different systems and their expansion to a greater number of frequency bands, the signaling load would also rise continuously. In addition, the administrative effort for acquiring and sending out information of the different systems appears to be comparatively large. Furthermore, a user terminal, after having been referred to the frequency spectrum, for example of the GSM mobile radio system, by the pilot channel, would still have to perform a large number of measurements of networks of different operators in order to find an operator network which is suitable for the desired service or the desired tariff or contract.

SUMMARY

It is one potential object to enable a user terminal to establish a connection setup to a desired radio communication system or network in a simple and quick manner.

The inventors propose that a user terminal selects an operator on the basis of information on at least one operator of a radio communication system in a country-specific pilot channel. Following this, the user terminal selects a radio communication system on the basis of information on at least one radio communication system in an operator-specific pilot channel of the selected operator and, finally, carries out an access to the selected radio communication system for the establishment of a connection.

Advantageously, the hierarchical structure of the pilot channels and a corresponding subdivision of the information in each case transmitted in the pilot channels provides for a simpler and more flexible administration of the contents of the pilot channels compared with the method of the related art, described by way of the introduction. Thus, for example, a change of the systems or networks supported by an operator does not require any change in the content of the country-specific pilot channel which, if necessary, is administered by a higher-level entity, for example a national regulating authority. Advantageously, the respective operator can also dynamically change, for example the assignment of physical resources to the individual systems or networks in the sense of a dynamic resource assignment in the pilot channel allocated to him, for example in order to optimize a load distribution in the systems or networks. In this context, the content of the operator-specific pilot channel is advantageously configured, for example, by the operator himself, for example by a correspondingly designed operation and maintenance function (O&M). If a plurality of operators use the same frequency spectrum, the current use and its corresponding signaling should preferably take place in agreement with one another on the operator-specific pilot channels.

In the same manner, the user terminal is advantageously enabled to pass through a uniform connection setup procedure in order to carry out a quick establishment of a connection to a desired system or network independently of its current location.

According to a further development, a reference to at least the operator-specific pilot channel is transmitted as information in the country-specific pilot channel. By this information, the user terminal can directly access the operator-specific pilot channel. The same applies to another development according to which a reference to at least one system-specific pilot channel of the at least one radio communication system is transmitted as information in the operator-specific pilot channel.

In accordance with a further embodiment of the method, information of a synchronization channel, control channel and/or pilot channel is transmitted in the system-specific pilot channel. In this context, the information is dependent on the respective configuration of the radio interface or the radio transmission standard, respectively, and can have a different content in dependence on the system or standard.

According to a further embodiment, the at least one operator-specific pilot channel and the at least one system-specific pilot channel are sent out by at least one radio access device of the at least one radio communication system. This has the advantageous effect that the number of devices involved in the sending out of the pilot channels is limited. According to a further development, the country-specific pilot channel is also sent out by at least one radio access device of the at least one radio communication system and/or a broadcast transmitting station of a public or private broadcasting system. Using broadcast transmitting stations offers the advantage that, by using facilities which are already in existence, large geographic areas can be covered with one radio cell. In this context, long transit times which may be due to the size of the radio cell do not have a negative effect since the signal transmission is exclusively in the downward direction, i.e. in the direction of the user terminals.

According to a further development, information on operators, with whom the at least one operator maintains national and/or international roaming agreements, is additionally transmitted in the country-specific pilot channel. This enables a user terminal which is located outside its own network to obtain in a simple manner an overview of the locally available operators and finally to select one operator. According to a further development, the information on operators with roaming agreements can be transmitted in specific frames within a sequence of frames of the country-specific pilot channel.

According to a further embodiment, finally, a reconfigurability of the user terminal by a transmission of information with respect to a system-specific configuration of the user terminal in the operator-specific pilot channel is supported, as a result of which the user terminal can be advantageously adapted to the radio access method of the selected system even before an access to the system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
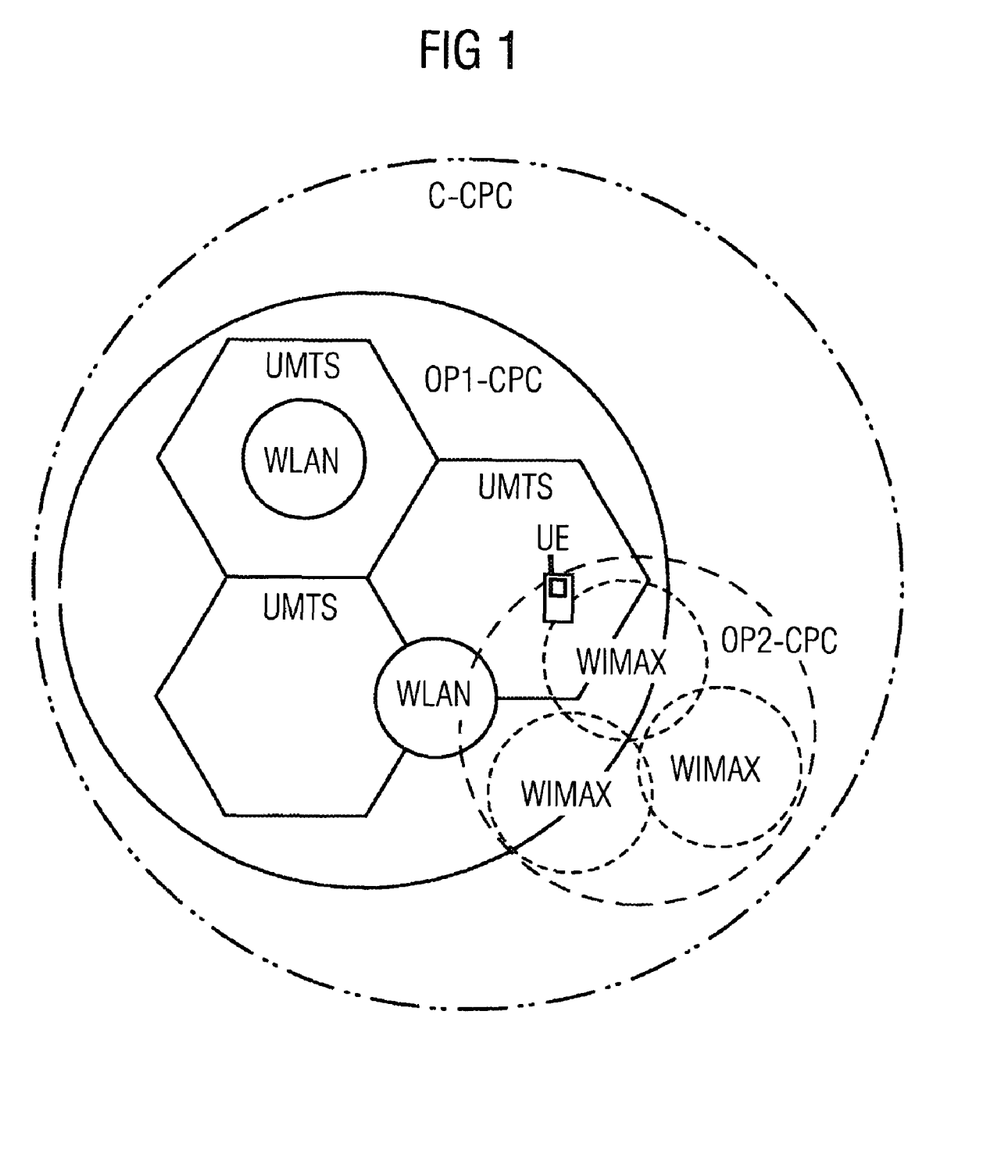
FIG. 1 shows a representation of coverage areas of respective pilot channels.

FIG. 1 shows by way of example the respective coverage areas of the proposed pilot channels. It shall be assumed in this context that a country-specific pilot channel C-CPC (Country level Common Pilot Channel) radiates information about the radio communication systems operating in the national region of a country, for example the Federal Republic of Germany. The country-specific pilot channel C-CPC is radiated, for example, by broadcast transmitting stations in order to ensure nationwide receivability. This can be done in accordance with a cellular system, i.e. by a multiplicity of transmitting stations which supply a respective region, a separation between the individual radio cells being effected, for example, by CDMA separation when a frequency band is used which is identical nationwide. Principles of so-called common-frequency systems can be applied in the same manner.

In accordance with the proposal for implementing a global pilot channel, described in the introduction, the country-specific pilot channel C-CPC is preferably organized in accordance with a globally uniform structure, i.e. it is sent out globally in a uniform frequency band or in a limited number of possible frequency bands, respectively, and utilizes a uniformly conFig.d radio interface, i.e. uniform coding, modulation, etc. This advantageously provides for rapid and reliable access of user terminals to these pilot channels.

In the region of a nation, a multiplicity of operators, as a rule, operate radio communication systems which may also support different system standards. FIG. 1 shows, for example, three radio cells of a mobile radio system according to the UMTS standard and two radio cells of a local wireless access network according to the WLAN standard (IEEE 802.11) as representative of the coverage area of a first operator OP1 operating nationwide. In this context, it must lastly be assumed that the coverage area of an operator operating nationwide corresponds to the desired coverage area of the country-specific pilot channel C-CPC as widely as possible so that, as an alternative to the abovementioned radiation of the country-specific pilot channel C-CPC by broadcast transmitting stations, it can also be sent out by the systems of the operators themselves.

Apart from the first operator OP1 operating nationwide, FIG. 1 also shows by way of example the coverage area of a second, locally operating operator OP2 with three radio cells of a wireless access system according to the so-called WiMAX standard (IEEE 802.16).

Furthermore, a user terminal UE which is located in the coverage area of systems and networks both of the first operator OP1 and of the second operator OP2, and is thus potentially capable of establishing a connection to each of these systems, is shown by way of example. For subsequent explanations it shall be assumed that the user terminal UE is technically constructed to support the three standards mentioned by way of example, wherein the method can be similarly carried out for user terminals which only support one of the standards.

In the exemplary situation of FIG. 1, it shall also be assumed that the user terminal UE is switched on or taken into operation for the first time. This occurs, for example, after the purchase of the terminal by the user or after arrival at the airport after a trip from another country. To establish a first contact to a system operating at the location of the user terminal, the user terminal will first tune itself to the frequency band of the country-specific pilot channel C-CPC, receive it and evaluate information contained therein and then select a suitable or predetermined operator, for example on the basis of operator information or roaming agreements of operators stored in the SIM card. As mentioned before, the frequency band and the access technology of the country-specific pilot channel C-CPC is preferably known per se to the user terminal UE so that the country-specific pilot channel C-CPC can be selectively and rapidly accessed.

On the basis of the information contained in the country-specific pilot channel C-CPC, the user terminal UE thus selects a suitable or predetermined operator and subsequently tunes the receiving device to the operator-specific pilot channel of the selected operator by a reference contained in the information of the country-specific pilot channel C-CPC.

A cellular structure, described above, of the country-specific pilot channel advantageously enables regional or local peculiarities to be taken into consideration and, as a result, to limit the volume of information to be transmitted in the pilot channel. Thus, for example, in the case where an operator operates in a locally limited way and thus exclusively in one particular one of the multiplicity of cells of the country-specific pilot channel, information and a reference to this operator could be sent out exclusively in this cell whereas no information whatsoever relating to this operator is sent out in all other cells of the country-specific pilot channel in which this operator is not operating. This would correspondingly apply if an operator, for example, operates wireless access networks exclusively in metropolitan areas. In this case, it would be sufficient that only the cells of the country-specific pilot channel which comprise the metropolitan areas affected send out information and references to this operator.

In the operator-specific pilot channel, in turn, information with respect to the systems and networks supported by the operator is transmitted so that the user terminal UE can subsequently select and access a suitable system or network, respectively. The user terminal UE is preferably again referred to the selected system or network by a reference to a system-specific pilot channel, synchronization channel or control channel contained in the information of the operator-specific pilot channel. In the text which follows, the term pilot channel will be used as synonym for such system-specific channels. In this context, the operator-specific pilot channel is transmitted, corresponding to the country-specific pilot channel, preferably in a uniform frequency band, for example in a subfrequency band of the country-specific pilot channel in order to provide for rapid access by the user terminal wherein, as an alternative, a limited number of frequency bands also appears to be possible and appropriate, in turn.

Figure 2:
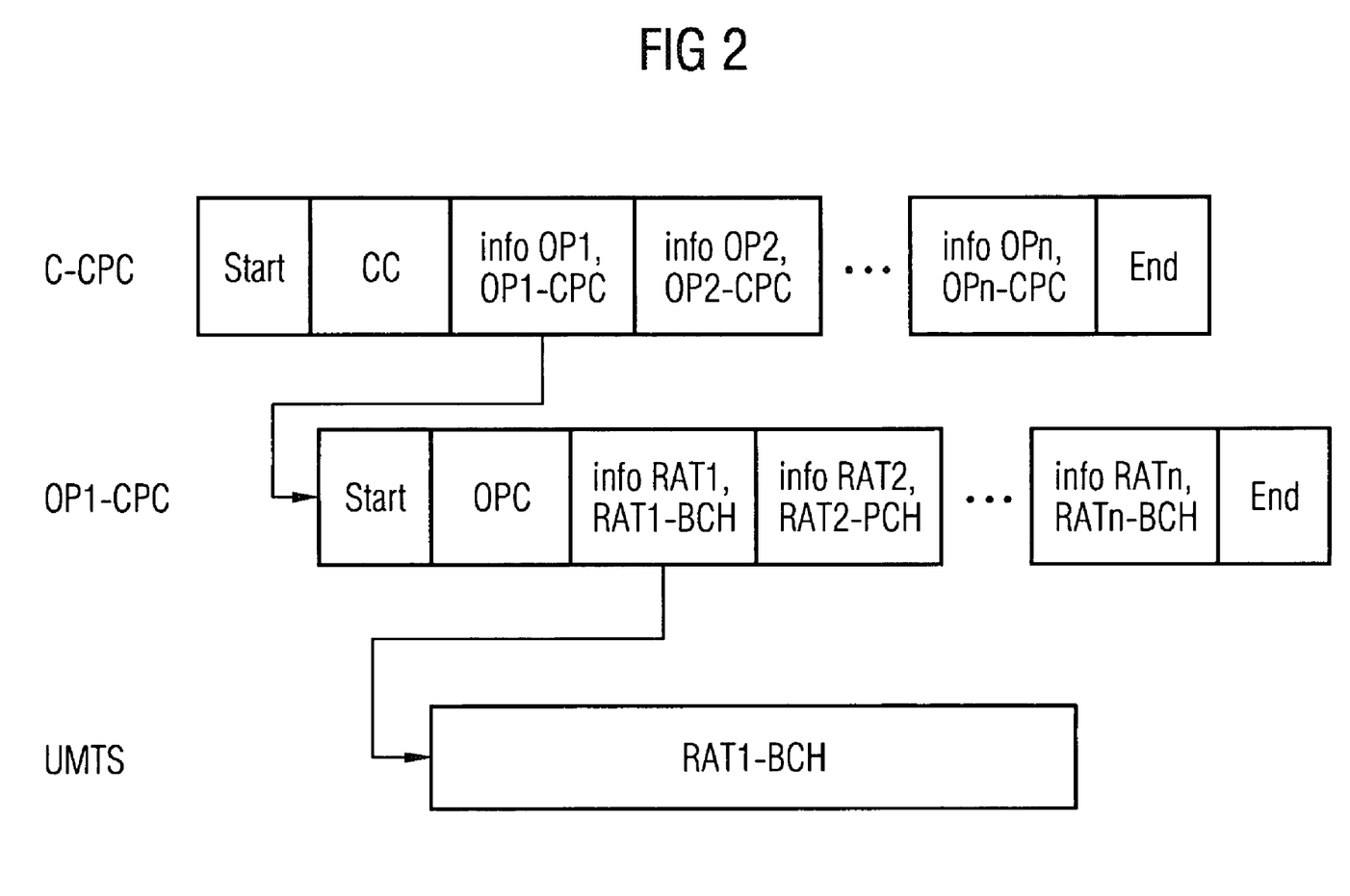
FIG. 2 shows a representation of the hierarchical structure of the pilot channels and their contents.

FIG. 2 shows by way of example the hierarchical structure of the proposed pilot channels and a respective exemplary frame structure, referring to the situation of FIG. 1.

The country-specific pilot channel C-CPC is composed, for example, of the several subfields of different content, shown in FIG. 2, wherein these subfields can also be transmitted in a different order. Together, the subfields produce a frame which is sent out periodically as mentioned above, for example by broadcast transmitting stations or operator stations.

The beginning of a frame is identified by a start field or starting sequence Start. This Start field can contain information about the identity of the pilot channel, for example with regard to the fact that this is a country-specific pilot channel, in contrast to an operator-specific pilot channel, but also a synchronization sequence which enables a user terminal to synchronize itself to the transmission in the pilot channel, and for detecting the beginning of a respective frame.

In a second subfield, following the start field start, of the country-specific pilot channel C-CPC, a country code (CC) is preferably transmitted on the basis of which the receiving user terminal UE can identify the country in the territorial field of which it is currently located. This country code CC can be used by the user terminal, for example, for matching it with information, stored on the SIM card or an integrated memory, relating to operators of this country, for example with respect to existing roaming agreements.

Following the second subfield of the country code CC, information info with respect to the operators OP1, OP2, . . . , OPn operating in the coverage area of the country-specific pilot channel C-CPC, including a respective reference to the operator-specific pilot channel or channels OP1-CPC, OP2-CPC, . . . , OPn-CPC (Operator level Common Pilot Channel) is transmitted in respective subfields. This information enables the user terminal UE, after evaluation and the abovementioned matching, to select a suitable operator, the first operator OP1 in the example of FIG. 2, and to directly access the pilot channel or channels OP1-CPC of this selected first operator OP1 by the reference.

Finally, a frame of the country-specific pilot channel C-CPC is preferably concluded by a subfield with an end sequence End. In the case of a periodic repetition of the transmission of the frame and unambiguous identifiability of the beginning of a frame by the start field, however, a transmission of the subfield of the end sequence End can also be omitted, however.

At the hierarchy level of the operator, a corresponding frame structure of a pilot channel is used but with at least partially different content of the subfields. The operator-specific pilot channel is also preferably periodically repeatedly sent out. FIG. 2 shows by way of example the frame structure of the operator-specific pilot channel OP1-CPC of the first operator OP1 selected by the user terminal UE.

Since, as a rule, the operator-specific pilot channel OP1-CPC is sent out in a frequency band disjoint from the country-specific pilot channel C-CPC, an identification of the beginning of a respective frame by a start field Start is again appropriate. Corresponding to the described field of the country-specific pilot channel C-CPC, this Start field can again contain information about the identity of the pilot channel, for example with regard to the fact that this is an operator-specific pilot channel, in contrast to the country-specific pilot channel C-CPC, but also a synchronization sequence which enables a user terminal to synchronize itself to the transmissions in the pilot channel. A frame of the operator-specific pilot channel OP1-CPC is preferably again ended by a subfield with an end sequence End, wherein in the case of a periodic repetition of the transmission of the frame and unambiguous identifiability of the beginning of a frame by the start field, a transmission of the subfield of the end sequence End may be omitted, if necessary.

As an alternative to utilizing a frequency band which is disjoint from the frequency band of the country-specific pilot channel, for transmitting the operator-specific pilot channels, a common frequency spectrum can also be advantageously used, wherein the individual pilot channels can be separated, for example, by a respective assignment of one or more subfrequency bands in the sense of an FDMA (Frequency Division Multiple Access) separation and/or by further known methods such as, for example, TDMA (Time Division Multiple Access) or CDMA (Code Division Multiple Access). In the same manner, pilot channels can be separated at the country or operator level if an identical frequency band is used for transmissions in adjacent cells.

In a subfield following the start field Start, for example, an operator code (OPC) is transmitted by which the user terminal UE or another user terminal accessing this pilot channel OP1-CPC can identify the first operator OP1.

In subfields following the subfield of the operator code OPC, information info with respect to the systems or system technologies RAT1, RAT2, . . . , RATn (Radio Access Technology) available in the coverage area of the operator-specific pilot channel OP1-CPC including a respective reference to the system specific pilot or control channel or channels RAT1-BCH, RAT2-PCH, . . . , RATn-BCH is transmitted. This information enables the user terminal UE, after evaluation and matching with its own technical capabilities, for example with the support of only a plurality of the available system technologies, to select a suitable system.

In accordance with the example of FIG. 1, the user terminal UE would receive information relating to the systems according to the UMTS and WLAN standard, operated in the coverage area of the pilot channel OP1-CPC, in the pilot channel OP1-CPC of the first operator OP1, and, for example, select the UMTS system for a first access with the aim of the establishment of a connection. Correspondingly, it shall be assumed in FIG. 2 that the UMTS system is represented by the first system technology RAT1 being specified. Since the user terminal UE is thus currently located in the coverage area of a radio cell of the UMTS system, an access to this system is possible after evaluation of the reference to the control channel of the UMTS system RAT1-BCH. For this purpose, a frame of a control channel of the UMTS system RAT1-BCH is shown by way of example on the next hierarchical level, i.e. at the system level, in FIG. 2.

Should the user terminal UE select the WLAN system, however, in the situation shown in FIG. 1, which is represented by the RAT2 system technology in FIG. 2 by way of example, it could not access this pilot channel after evaluation of the reference to the pilot channel of the WLAN system RAT2-PCH since it is currently located outside the coverage area of a radio cell of the WLAN system. In this case, the user terminal UE, after determining that a reception of the pilot channel of the WLAN system RAT2-PCH is not possible, will select, by again accessing the operator-specific pilot channel OP1-CPC, an alternative system, for example the UMTS system identified by the first system technology RAT1 and then access the latter. If this newly selected system is not receivable by the user terminal UE, either, and/or the selected operator does not operate an alternative system which can be used by the user terminal UE, the user terminal UE can again access the country-specific pilot channel C-CPC and select a new operator.

The operator-specific pilot channel OP1-CPC with information relating to the systems operated by the respective operator advantageously enables the operator to be able to control, for example, a load distribution between the individual systems. Thus, according to the example of FIGS. 1 and 2, the first operator OP1, in the case of a full loading or overloading of the WLAN system, could suppress the transmission of information to this system in the pilot channel OP1-CPC, and thus the potential access of user terminals to this system until a load situation is restored which allows further connections to be accepted. As an alternative, the current load situations of the individual operated systems can also be signaled to the user terminals by specific information, for example by a status indicator in the information info with respect to the system technology.

It also appears possible to indicate the distribution of physical resources by changing the information in the subfields of the operator-specific pilot channel in order to achieve, for example, a load balance between systems. If, for example, two systems use a common frequency band within a coverage area, a corresponding reference to a pilot or control channel belonging to this frequency band is signaled in the subfield in dependence on which of the two systems is currently using the frequency band.

As a supplement to the references, described above, in the country-specific and the operator-specific pilot channels to the pilot and control channels of the next lower hierarchy level in each case, it may be appropriate also to accommodate a reference to the next higher hierarchy level of the pilot channels. In the example of FIG. 2, the control channel RAT1-BCH of the UMTS system could thus similarly contain a reference to the pilot channel OP1-CPC of the first operator OP1. By this reference, a user terminal UE which maintains an active connection to the UMTS system could directly access the pilot channel of the operator OP1-CPC, for example for preparing an intersystem call forwarding or the establishment of an additional service.

Figure 3:
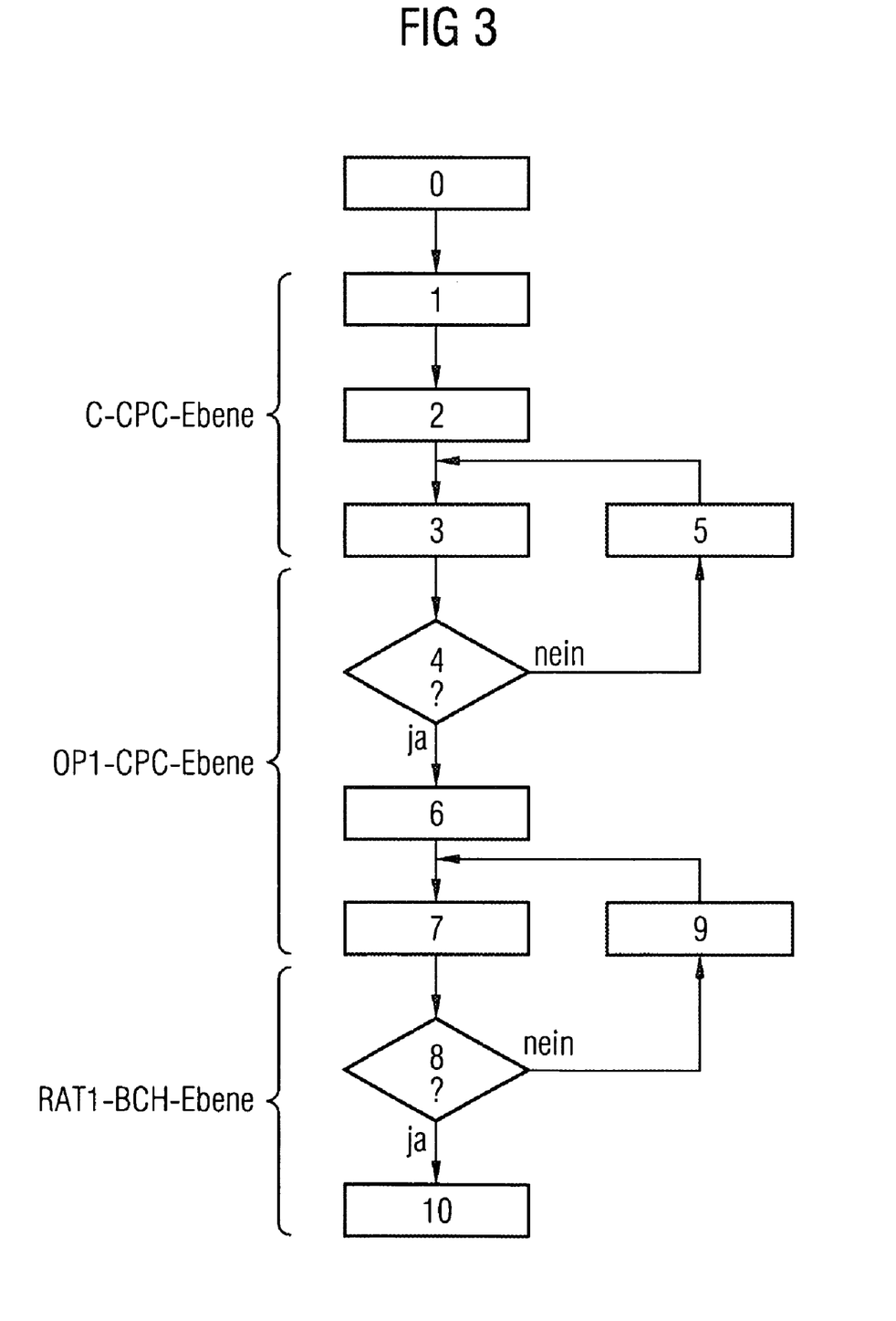
FIG. 3 shows a flowchart of an access of a user terminal to a system.

In the text which follows, different procedures of the access of a user terminal to the different pilot channels or control channels, respectively, are described with reference to the flowchart of FIG. 3, shown by way of example.

Firstly, a first exemplary procedure is described on the basis of the situation that the user terminal UE has no knowledge whatsoever about available systems. This situation occurs, for example, when the user terminal is taken into operation the first time or switched on after a trip outside the homeland.

After switch-on or startup, step 0, of the user terminal UE, it will first look for a country-specific pilot channel C-CPC for establishing a connection to a network or system, step 1. If, as explained above, country-specific pilot channels C-CPC are globally sent out in one or more uniform frequency bands, the user terminal UE will tune its receiving device to this frequency band or scan the possible frequency bands for signals of a country-specific pilot channel C-CPC. The frequency band or bands used for the country-specific pilot channel are known to the user terminal UE, for example by the storage of relevant information on the SIM card of the user or a memory of the user terminal. Thus, the transmission method used for the transmission of the pilot channel, for example the coding, modulation, etc., is known to the user terminal UE, so that fast detection and subsequent reception of a country-specific pilot channel C-CPC by the user terminal UE is possible. In the case of a receiving device designed exclusively for the reception of country-specific pilot channels, for example an RDS (Radio Data System) receiver for public broadcast systems, such information is correspondingly not required or only limited to the transmission method.

After receiving and evaluating, step 2, of the information transmitted in the country-specific pilot channel C-CPC, the user terminal UE first selects a suitable operator, step 3. This is done in accordance with the methods described above with respect to FIGS. 1 and 2. After evaluation of the country code CC transmitted in the country-specific pilot channel C-CPC, the user terminal UE knows, for example, whether it is located in the coverage area of its home operator or if it must take into consideration roaming agreements between the home operator and foreign operators for the selection of an operator available at the current location of the user terminal. For this purpose, for example, matching with information stored on the SIM card with respect to the home operator and his roaming partner is carried out. If no direct roaming partner is known, the user terminal UE initially optionally selects one of the available operators. This situation will still be described in greater detail in the text which follows.

After selecting an operator, the user terminal UE tunes the receiving device to the pilot channel, for example the pilot channel OP1-CPC of the selected first operator OP1. This is done by taking into consideration the reference in the information of the operator-specific subfield of the country-specific pilot channel C-CPC. In dependence on whether the user terminal UE is capable of receiving the pilot channel OP1-CPC of the selected operator, step 4, it will, in the case of adequate receivability of the pilot channel, evaluate its information, step 6, or, in the case of no or only inadequate receivability of the pilot channel, block the selected operator, step 5, and perform a reselection, step 3, of a suitable operator.

After evaluating the information of the operator-specific pilot channel, the pilot channel OP1-CPC of the first operator OP1 according to the example of FIGS. 1 and 2, the user terminal UE selects a suitable system or network, step 7. As described above, this selection is carried out, for example, in dependence on the technical equipment of the user terminal or on the service to be set up. After selecting a system or network, the UMTS system according to the example of FIGS. 1 and 2, the user terminal UE tunes the receiving device to the control channel RAT1-BCH in order to receive it and evaluate its content. If the user terminal UE can adequately receive the control channel RAT1-BCH and/or the system does not indicate any overload, and thus blocking of the access, step 8, it will receive it and evaluate it, step 10, in order to subsequently carry out an access to the system according to the mechanisms predetermined by the standard of the system. If, in contrast, the user terminal UE is not capable of receiving the control channel RAT1-BCH of the selected system, for example because it is currently located outside a radio cell of the system, or overload of the system is indicated, it will block the selected system, step 9, and carry out a reselection of a suitable system, step 7.

If, after an access by the user terminal UE to the selected UMTS system, it is found that it does not support, for example, the desired service to be established, the user terminal UE again carries out a reselection of an alternative system of the operator, the WLAN system according to the example of FIGS. 1 and 2. If, however, no alternative systems of the operator are available or the user terminal UE cannot access the newly selected system, either since, as specified by way of example in FIG. 1, it is located outside the coverage area or cell of the WLAN system, the user terminal UE carries out a reselection of an alternative operator by again accessing the country-specific pilot channel C-CPC.

A further exemplary situation occurs when the user terminal UE already has knowledge of the system last used. This can be available in the form of a storage of connection parameters of the last active connection. In this case, the user terminal UE will first attempt, after switching-on, to receive again the control or pilot channel last used. If this is not possible since the user terminal UE, for example, has changed its location since the last active connection, it will attempt to access the operator-specific pilot channel of the operator last used in order to select a new system or network. For this purpose, it can use, for example, a reference to the operator-specific pilot channel transmitted in the control channel of the system. If this is not possible, either, the user terminal UE will lastly access the country-specific pilot channel C-CPC and progressively select an operator and a system in accordance with the above description.

As an alternative to the previous description, however, the method described with respect to FIG. 3 can be carried out in which the user terminal firstly always accesses the country-specific pilot channel each time the user terminal UE is switched on again, without making use of the experience of the last active connection. In this situation, at least the two approaches described thus exist, based on the lowest hierarchy level, i.e. the system-specific pilot channel, or the topmost hierarchy level, i.e. the country-specific pilot channel. In this context, the use of one of these approaches is predetermined for the user terminal or can be adaptively selected by the user terminal.

In order to reduce the number of unsuccessful accesses by the user terminal to systems which are not available at the current location of the user terminal, utilization of position information appears to be appropriate. If the user terminal knows its own position, for example due to an integrated GPS receiver or other known methods, a match with information about the respective geographic coverage area of the systems can be carried out by the user terminal. Information about this coverage area can be accepted, for example, in the information about the respective system in the subfields of the operator-specific pilot channel. In the example of FIG. 2, the first operator OP1 would specify in his pilot channel OP1-CPC, for example, the respective geographic network coverage areas of the UMTS and WLAN system.

As an alternative or supplementary thereto, such information about a respective geographic coverage area of the operators or their pilot channels can also be accepted in the country-specific pilot channel. According to the example of FIG. 2, the respective geographic network coverage areas of the first operator OP1 and of the second operator OP2 would thus be specified in the country-specific pilot channel C-CPC. Matching the current position with the coverage area of the system would take place in supplementary manner in step 4 or 8, respectively, according to the flowchart of FIG. 3.

Relations between individual operators in the sense of roaming agreements are subject to continuous changes. Since, according to the related art, a list of roaming partners of the home operator is usually stored in the SIM card of a user before the first start-up and is subsequently no longer renewed, it may no longer be valid even after a short time. If, according to the above description, a user terminal is located outside the coverage area of his home operator, it will preferably select, utilizing the country-specific pilot channel, an operator with whom the home operator has concluded a roaming agreement in order to have to pay, for example, lower charges or to be able to use special services. If, however, the user terminal selects an operator with whom there is no longer an agreement due to an outdated list of roaming partners in this situation, the user would incur, for example, disadvantageously higher charges than expected by him.

In order to facilitate for the user terminal the choice of an operator with whom there is a roaming agreement and to ensure that the information is up-to-date, it is proposed, according to an embodiment, to transmit information relating to roaming agreements at the hierarchy level of the country-specific pilot channel C-CPC. In return, this information can be used by the user terminal for updating the stored list of roaming partners, independently of whether the user is located in the area of his home network or not.

Figure 4:
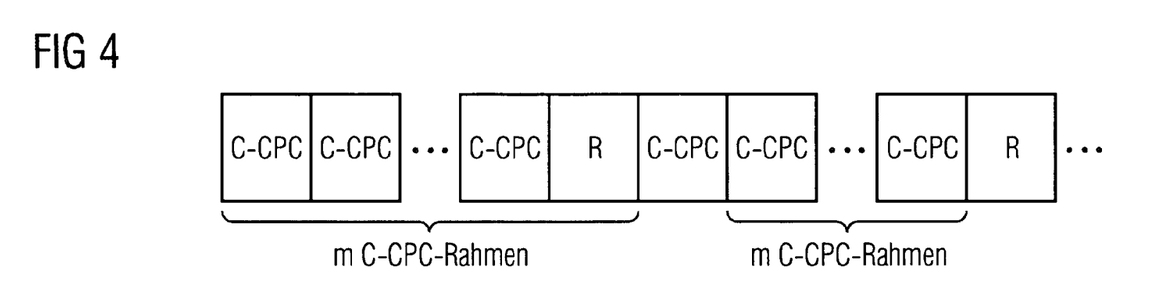
FIG. 4 shows a sequence of frames of a country-specific pilot channel.

According to FIG. 2, the information can be transmitted, for example, by supplementing the information info in the operator-specific subfields of the C-CPC frame. As an alternative, special frames R in the sequence of frames of the country-specific pilot channel C-CPC can be used for transmitting information relating to roaming agreements of the operators listed in the subfields of the country-specific pilot channel C-CPC as shown in FIG. 4 by way of example. After a sequence of in each case m frames of the country-specific pilot channel C-CPC, for example, one frame R with information relating to roaming agreements is transmitted. The occurrence of the special frame R within the sequence of C-CPC frames can be signaled, for example, in the start fields Start of the C-CPC frames so that a user terminal, if it knows that the next special frame can only be received at a particular time interval, can switch off the receiving device for this period of time and, as a result, advantageously save energy.

Figure 5A:
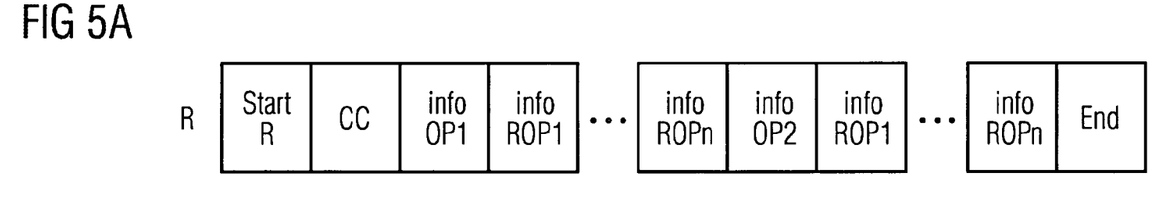
FIGS. 5a, 5b show structures of frames with information with respect to operators with roaming agreements.

An exemplary structure of such a frame R with information relating to operator-specific roaming agreements is shown in FIG. 5a. In accordance with the frame structure of FIG. 2, a frame R begins with a start field Start R for indicating the beginning of the frame and for identifying this special frame in comparison with the frames of the country-specific pilot channel C-CPC. The start field Start R is followed by a field with information of the country code CC. The subfield following the subfield of the country code CC carries information info relating to, for example, the first operator OP1, wherein this information can largely correspond to the operator information in the normal C-CPC frame. The subfield of the information info relating to the first operator OP1 is followed by subfields with respective information info relating to operators ROP1, . . . , ROPn, with whom the first operator OP1 has concluded a roaming agreement. Corresponding information is transmitted to the second operator OP2 and his operators ROP1, . . . , ROPn connected by roaming agreement. After it has determined by the country code that it is located outside the coverage area of its home operator, a user terminal UE receiving this information will look for the code or information with respect to the home operator in the sequence of subfields of frame R and find one or more operators with roaming agreement, which are available within the coverage area of the country-specific pilot channel C-CPC.

Figure 5B:
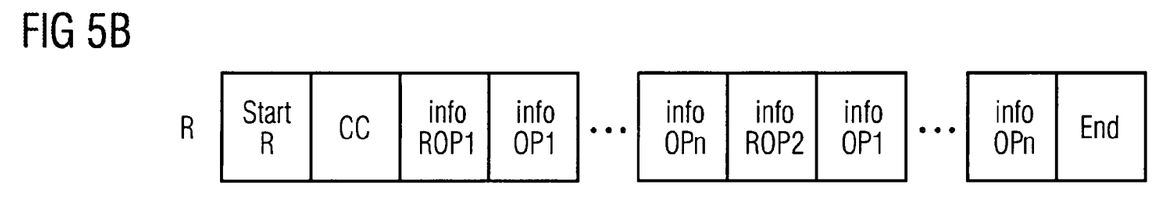

As an alternative, a frame structure of the special frame R according to FIG. 5b can also be implemented. According to this exemplary structure, the operators ROP1, ROP2, with whom the operators OP1, . . . , OPn available in the coverage area of the country-specific pilot channel C-CPC have roaming agreements, are listed and in each case allocated the available operators OP1, . . . , OPn with roaming agreements in subsequent subfields.

Due to the rising number of radio access technologies or adaptations to existing technologies, for example in the form of new modulation or coding types, expansion of the frequency spectrum, etc., user terminals will be increasingly equipped as terminals with a so-called software defined radio functionality (SDR) in future. This provides for individual adaptation of the devices of a terminal involved in the radio transmission to the radio access technology required in each case by a purely software-based change.

From the German patent specification DE 19734933 C1, for example, a method is known in which, for the purpose of adapting a mobile station to a method of radio access, supported by a mobile radio system, to a pilot channel transmitted by a broadcast transmitting station, information about at least one radio access method of the mobile radio system is transmitted, the pilot channel is received and evaluated by the mobile station and the mobile station selects a radio access method by the information and generates an adaptation to this method. For this purpose, the mobile station is referred by the signaling, for example to a broadband transmission channel on which program modules are transmitted. These program modules are subsequently used by the mobile station for generating the adaptation.

Figure 6:
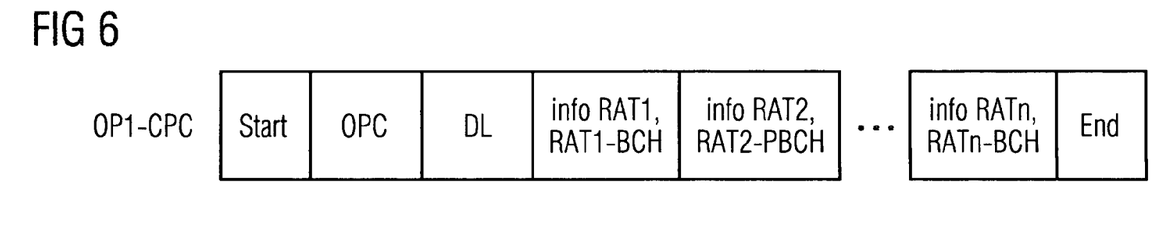
FIG. 6 shows the structure of an operator-specific frame with a subfield for reconfigurable terminals.

FIG. 6 specifies, on the basis of the frame structure of the operator-specific pilot channel OP1-CPC of FIG. 2, a frame structure by which such reconfigurable terminals can be supported in accordance with the method. A special subfield DL of the frame contains, for example, information relating to the radio access technologies in each case listed in the text which follows, so that the user terminal, before accessing this radio access technology, can adapt its devices to this technology. This information can be realized, for example, in the form of parameter information but also in the form of complete program modules. As an alternative to a subfield comprising all available access technologies, a separate field can be provided for each access technology or the information info in the subfields can be supplemented by such configuration information.

Figure 7:
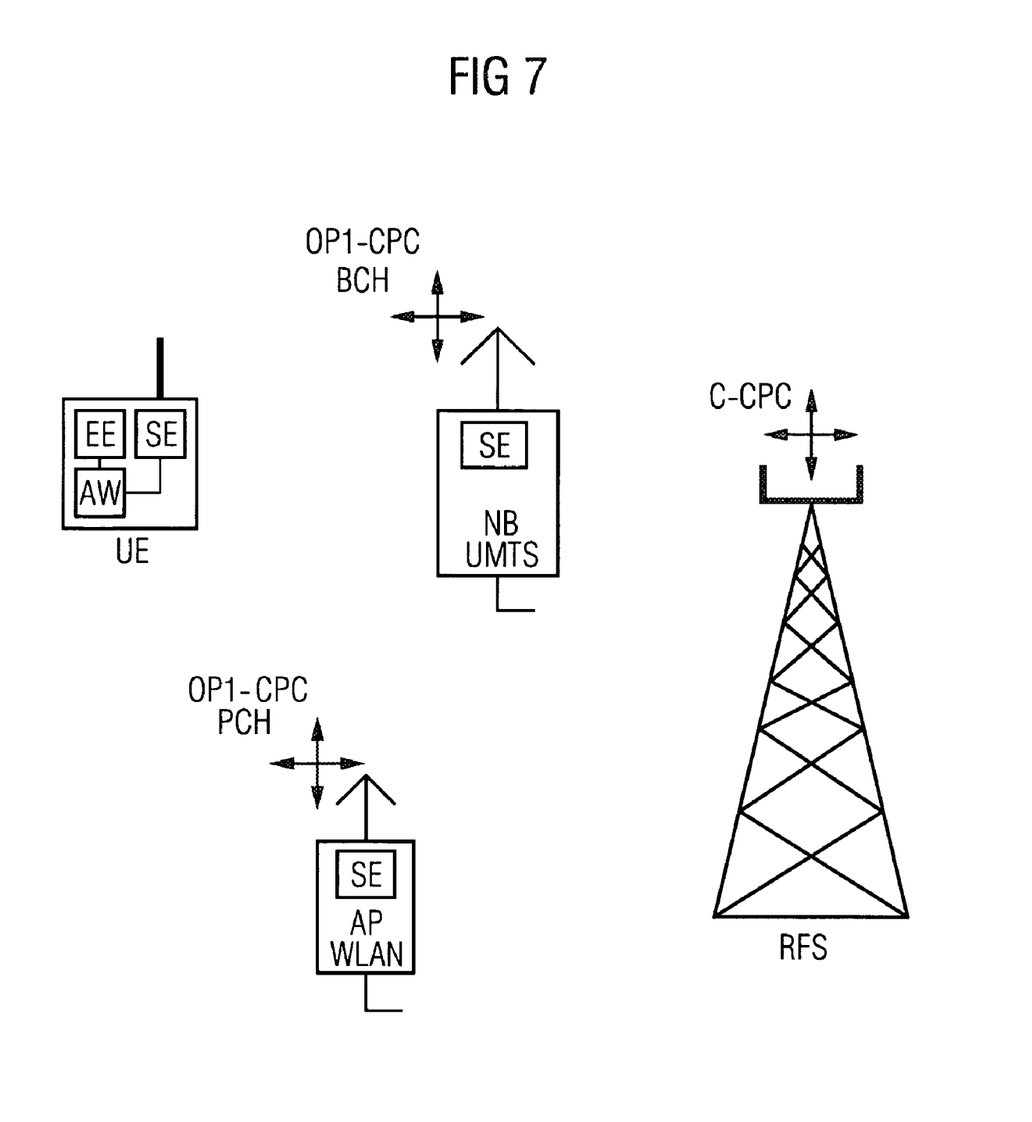
FIG. 7 shows a representation of system components.

FIG. 7, finally, shows by way of example the individual system components which enable the proposed method to be realized. The geographic arrangement is based on the example of FIG. 1. The systems or networks are represented simplified by a respective radio access device, a base station NB (Node B) in the case of the exemplary UMTS system and a so-called access point AP in the case of the exemplary WLAN system. This base station NB or access point AP exhibits, apart from known components and devices, not shown, in each case a transmitting device SE which send out via respective antenna devices signals both of the operator-specific pilot channel OP1-CPC and of the system-specific control BCH (broadcast channel) or PCH (pilot channel), particularly omnidirectionally on the radio interface. By way of example, it is assumed that signals of the country-specific pilot channel C-CPC are emitted by a broadcast transmitting station RFS, for example, of the public broadcast system. As explained above, it is, however, similarly conceivable that the signals of the country-specific pilot channel C-CPC, like the operator-specific pilot channels, are sent out by the base stations or access points of the operator networks.

The signals both of the country-specific pilot channel C-CPC and of the operator-specific pilot channel OP1-CPC are received by a receiving device EE of the user terminal UE (user equipment) and evaluated in an evaluating device AW. These devices of the user equipment and a transmitting device SE controlled by the evaluating device AW carry out the access to the individual pilot channels and a selection of a suitable operator or system according to the method described above. In this context, an involvement of other known devices of the user terminal UE is just as conceivable as that of supplementary devices, for example of a special receiver for signals of the country-specific pilot channel C-CPC sent out by broadcast transmitting stations.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for establishing a connection with a terminal in a radio communication system, comprising:
   selecting an operator at the terminal based on operator information transmitted in a country-specific pilot channel, the operator information relating to at least one operator of a radio communication system;
   selecting a radio communication system based on system information transmitted in an operator-specific pilot channel of the selected operator, the system information relating to at least one radio communication system; and accessing the selected radio communication system to establish the connection, wherein the terminal is located within a coverage area of the selected operator, the selected operator maintains a roaming agreement with at least one agreement operator outside the coverage area, and information on the agreement operator and the roaming agreement is transmitted in the country-specific pilot channel.

2. The method as claimed in claim 1, wherein a reference to the operator-specific pilot channel is transmitted in the country-specific pilot channel.

3. The method as claimed in claim 1, wherein a reference to a system-specific pilot channel of the selected radio communication system is transmitted in the operator-specific pilot channel.

4. The method as claimed in claim 1, wherein the country-specific pilot channel is sent out by a radio access device of the selected radio communication system and/or a broadcast transmitting station of a public broadcasting system.

5. The method as claimed in claim 1, wherein information on a system-specific configuration of the terminal is transmitted in the operator-specific pilot channel.

6. The method as claimed in claim 3, wherein the system-specific pilot channel comprises at least one of a synchronization channel and a control channel.

7. The method as claimed in claim 3, wherein the operator-specific pilot channel and the system-specific pilot channel are sent out by a radio access device of the selected radio communication system.

8. The method as claimed in claim 1, wherein the information on the agreement operator and the roaming agreement is transmitted in specific frames within a sequence of frames of the country-specific pilot channel.

9. The method as claimed in claim 2, wherein a reference to a system-specific pilot channel of the selected radio communication system is transmitted in the operator-specific pilot channel.

10. The method as claimed in claim 9, wherein the system-specific pilot channel comprises at least one of a synchronization channel and a control channel.

11. The method as claimed in claim 10, wherein the operator-specific pilot channel and the system-specific pilot channel are sent out by a radio access device of the selected radio communication system.

12. The method as claimed in claim 11, wherein the country-specific pilot channel is sent out by a radio access device of the selected radio communication system and/or a broadcast transmitting station of a public broadcasting system.

13. The method as claimed in claim 12, wherein the terminal is located within a coverage area of the selected operator, the selected operator maintains a roaming agreement with at least one agreement operator outside the coverage area, and information on the agreement operator and the roaming agreement is transmitted in the country-specific pilot channel.

14. The method as claimed in claim 13, wherein the information on the agreement operator and the roaming agreement is transmitted in specific frames within a sequence of frames of the country-specific pilot channel.

15. The method as claimed in claim 14, wherein information on a system-specific configuration of the terminal is transmitted in the operator-specific pilot channel.

16. A method for operating radio communication systems, comprising:

transmitting signals of a country-specific pilot channel from a radio access device, the signals carrying information on local operators of respective radio communication systems;

transmitting an operator-specific pilot channel from the radio access device, the operator-specific pilot channel carrying information on one of the local operators; and transmitting a system-specific pilot channel from the radio access device, the system-specific pilot channel carrying information on a first of the radio communication systems, the radio access device being part of the first radio communication system, wherein a terminal is located within a coverage area of a selected operator, the selected operator maintains a roaming agreement with at least one agreement operator outside the coverage area, and information on the agreement operator and the roaming agreement is transmitted in the country-specific pilot channel.

17. A radio communication system having a radio access device, comprising:

a transmitting device to transmit:

signals of a country-specific pilot channel, the signals carrying information on local operators of respective different radio communication systems;

an operator-specific pilot channel carrying information on the different radio communication systems; and a system-specific pilot channel carrying information specific to the radio communication system of the radio access device, wherein a terminal is located within a coverage area of a selected operator, the selected operator maintains a roaming agreement with at least one agreement operator outside the coverage area, and information on the agreement operator and the roaming agreement is transmitted in the country-specific pilot channel.

18. A user terminal comprising:

a receiver to receive a country-specific pilot channel, an operator-specific pilot channel and a system-specific pilot channel;

an evaluating device to evaluate information from the country-specific pilot channel to select an operator, to evaluate information from the operator-specific pilot channel of the selected operator to select a radio communication system, and to evaluate information from system-specific pilot channel of the selected radio communication system to decide on an access process for the selected radio communication system; and a transmitter to transmit signals to access the selected radio communication system, wherein the terminal is located within a coverage area of the selected operator, the selected operator maintains a roaming agreement with at least one agreement operator outside the coverage area, and information on the agreement operator and the roaming agreement is transmitted in the country-specific pilot channel.

* * * * *